(12) United States Patent
Welfeld

(10) Patent No.: US 7,350,202 B2
(45) Date of Patent: Mar. 25, 2008

(54) METHOD FOR RE-PROGRAMMING A FIRMWARE STATE MACHINE DURING EXECUTION

(76) Inventor: Feliks J. Welfeld, 1449 Plumber Avenue, Ottawa, Ontario (CA) K1K 4B2

(*) Notice: Subject to any disclaimer, the term of this patent is extended or adjusted under 35 U.S.C. 154(b) by 686 days.

(21) Appl. No.: 10/423,954

(22) Filed: Apr. 28, 2003

(65) Prior Publication Data

US 2004/0015673 A1    Jan. 22, 2004

Related U.S. Application Data

(63) Continuation-in-part of application No. 09/459,460, filed on Dec. 13, 1999, now abandoned, which is a continuation-in-part of application No. 09/313,182, filed on May 18, 1999, now Pat. No. 6,349,405.

(51) Int. Cl.
   *G06F 9/45* (2006.01)
(52) U.S. Cl. .................................... 717/170
(58) Field of Classification Search ............... 717/168; 711/103, 147, 152
   See application file for complete search history.

(56) References Cited

U.S. PATENT DOCUMENTS

| | | | | |
|---|---|---|---|---|
| 4,695,977 A | * | 9/1987 | Hansen et al. | 379/93.14 |
| 5,315,708 A | * | 5/1994 | Eidler et al. | 711/119 |
| 5,375,248 A | * | 12/1994 | Lemay et al. | 713/600 |
| 5,546,453 A | * | 8/1996 | Hebert | 379/242 |
| 5,825,199 A | * | 10/1998 | Shelton et al. | 326/38 |
| 5,940,487 A | * | 8/1999 | Bunch et al. | 379/201.03 |
| 6,128,307 A | * | 10/2000 | Brown | 370/412 |
| 6,243,453 B1 | * | 6/2001 | Bunch et al. | 379/201.01 |
| 6,252,879 B1 | * | 6/2001 | Zhang | 370/401 |
| 6,378,068 B1 | * | 4/2002 | Foster et al. | 713/1 |
| 7,197,044 B1 | * | 3/2007 | Kadambi et al. | 370/418 |

OTHER PUBLICATIONS

Jacob, J; Chow, P; "Memory Interfacing and Instruction Specification for Reconfigurable Processors", p. 145-154, ACM 1999, retrieved May 31, 2006.*
Lim, A. S.; Friedberg, S.A.; "A State Machine Approach to Reliable Distributed Systems", p. 204-212, 1992, IEEE, retrieved May 31, 2006.*
Mitchell, S.; Naguib, H.; Coulouris, G.; Kindberg, T; "Dynamically Reconfiguring Multimedia Components: A Model-based Approach", p. 040-047, Sep. 1998 ACM, retrieved May 31, 2006.*
Schneider, F. B.; "Implementing Fault-Tolerant Services Using the State Machine Approach: A Tutorial", p. 299-319, 1990 ACM, retrieved May 31, 2006.*

* cited by examiner

*Primary Examiner*—Mary Steelman
(74) *Attorney, Agent, or Firm*—Freedman & Associates

(57) ABSTRACT

A method of reprogramming classification data in a packet classification state machine without interrupting the operation of the state machine is disclosed. Data relating to a plurality of new nodes from a starting node of the classification tree within a classification tree are stored such that they accurately indicate subsequent nodes within the existing data structure. Once the data is stored, a new first node address is stored in a predetermined location. Thereby causing subsequent state machine executions to begin at a new node. Preferably, the new first node address is stored using an atomic operation such that no reading of the first node address is possible during the store operation. The method allows a plurality of state machines to simultaneously use a same classification data memory because the method does not involve overwriting existing data.

28 Claims, 10 Drawing Sheets

METHOD FOR RE-PROGRAMMING A FIRMWARE STATE MACHINE DURING EXECUTION

This application is a continuation-in-part of U.S. patent application Ser. No. 09/459,460 filed Dec. 13, 1999 now abandoned, which is a continuation-in-part of U.S. patent application Ser. No. 09/313,182 filed May 18, 1999 now issued as U.S. Pat. No. 6,349,405 on Feb. 19, 2002.

FIELD OF THE INVENTION

The invention relates to programmable state machines and more particularly to programmable packet classification state machines for use in high-speed communication.

BACKGROUND OF THE INVENTION

In the past, programmable state machines were provided with procedural programming. This permits flow from one state to another state upon certain conditions according to a desired sequence. Because a state machine effectively controls a sequence of processing steps, the concept of a truly non-procedural programming method for a state machine appears contradictory. To this end, many "non-procedural" methods of programming state machines have been proposed. Nevertheless, upon analysis these have been found to be procedural or somewhat procedural. The concept of branches and loops is common in these methods and a flow diagram of operation is often evident.

Until now because of the procedural nature of state machines, non-procedural methods of programming the state machines have been regarded as having few advantages. Some of the "non-procedural" methods of programming a state machine focus on reuse of programming code and modularity of the code. Therefore, procedural elements within each state are not only permitted, but are viewed as somewhat essential. Different states, however, are commonly easily reused or assembled into a whole classification description.

When reprogramming a state machine, it is important to consider a concept of a truly non-procedural method of implementing a programmable state machine. Changes to state machine programming are then added without concern for state flow, since the description of the state machine is non-procedural. Further, implementation of the state machine is performed by the compiler and does not require significant design by a state machine designer or, more importantly, an end user.

Reprogramming of a state machine having procedural programming is considered a straightforward task. State machine execution is paused, new programming is loaded into program memory and then the state machine is restarted. The process of pausing the state machine often involves halting data flow, which is undesirable. For use in firewalls and other security applications, a change in programming often results from a change in security procedures. As such, it is important to load the change as quickly as possible. Of course, it is evident to one skilled in the art that it is often impractical to shut down a system during reprogramming and, hence reprogramming of a system often only occurs at certain times. This is inconvenient.

Another problem is encountered with current reprogramming techniques for programmable state machines when several state machines share a common program memory. When upgrading the programming for any of the state machines, all state machines are paused. This is a significant problem that is possibly avoided by duplicating program memory in order to allow all but one state machine to remain operative during a reprogramming operation. Another method of avoiding this problem is to provide each state machine with dedicated state machine memory.

A current area of research in high-speed state machine design is the area of digital communications. Commonly, in digital communication networks, data is grouped into packets, cells, frames, buffers, and so forth. The packets, cells etc, contain data and classification information. It is important to classify packets, cells, etc. for routing and correctly responding to data communications. An approach to classifying data of this type uses a state machine.

For Gigabit Ethernet, it is essential that a state machine operate at very high speeds to process data in order to determine addressing and routing information as well as protocol-related information. Unfortunately, at those speeds, memory access is a significant bottleneck in implementing a state machine or any other type of real time data processor. This is driving researchers to search for innovative solutions to increase classification performance. An obvious solution is to implement a classification state machine completely in hardware. Non-programmable hardware state machines are known to have unsurpassed performance and are therefore well suited to these high data rates; however, the implementation of communication protocols is inherently flexible in nature. A common protocol today may be obsolete in a few months. Therefore, it is preferable that a state machine for use with Gigabit Ethernet is programmable. In the past, solutions for 10 Mbit and 100 Mbit Ethernet data networks required many memory access instructions per state in order to accommodate programmability. This effectively limits operating speeds of the prior art state machines.

A programmable state machine for classification of data can be implemented entirely in software. Of course, software state machines are often much slower than their hardware equivalents. In a software state machine, each operation is performed by a software instruction and state changes result in branch operations. As is evident to those of skill in the art, to implement a high-speed state machine in software for packet classification, requires many instructions per second—many more than a billion—requiring expensive parallel processors or technologies unknown at present. In fact, a severe limitation to performance is the speed of memory devices. For example, should a 7 ns memory device be used, less than one memory access per memory device is possible for each bit of a Gigabit Ethernet stream. Thus, if each byte—8 bits—of data is processed in a single state, only one memory access operations is possible for each state. To implement such a system as a purely software solution is impractical and unlikely.

Current state of the art integrated memory devices achieve performance in the area of 7 ns per memory access when timing and other factors are taken into account. Therefore, pure hardware implementations of state machines fast enough to implement a Gigabit Ethernet packet classifier are possible so long as only one memory access is required for every 8 bits within the Ethernet data stream. Prior art implementations of such a state machine use a branching algorithm to allow state transitions within the time frame of a predetermined number of bits. The address data for the branching algorithm is stored in program memory. When the predetermined number of bits is 8, each state transition occurs within 8 ns. One method of achieving this performance is to store a table of data having 256 entries for each possible state. The table address is then concatenated with 8 bits from the data stream to determine a next state address.

This continues until a value indicative of a classification or a failure to classify is encountered.

Unfortunately, the amount of memory required to implement a system, such as that described above, is prohibitive. For example, using 8 bits at a time requires up to 256 entries per table, 16 bits at a time requires 65,536 entries. The exact number of tables also depends on a number of terminal states. Since integrated memory having a high storage capacity is not available, implementation of a prior art programmable packet classification state machines having large numbers of edges in integrated memory is currently not feasible.

It has been found that a programmable hardware state machine for use in packet classification of high-speed data communications wherein reprogramming of the state machine is performed according to a non-procedural method, would be advantageous.

It would also be advantageous to provide a method of programming a state machine such that easy modification of state machine programming is possible during operation of a plurality of state machines using the same program memory.

OBJECT OF THE INVENTION

In order to overcome these and other limitations of the prior art, it is an object of the invention to provide state machine architecture for supporting a plurality of state machines simultaneously.

It is another object of the present invention to provide a method of reprogramming state machine program memory without requiring disruption of state machine operation.

SUMMARY OF THE INVENTION

In accordance with the invention there is provided a reprogrammable state machine comprising: a program memory for storing programmable data relating to at least one of state machine states and state machine state transitions; and, a start address memory location supporting one of atomic and pseudo-atomic write operations of data to the entire location and for storing data indicative of a start address of state machine programming stored within the programmable memory, the data indicative of a start address reprogrammable during operation of the state machine, where no other memory access operation is performable by the reprogrammable state machine during the duration of the one of the atomic and pseudo-atomic write operation once the one of the atomic and pseudo-atomic write operation has commenced.

In accordance with the invention there is provided a reprogrammable state machine memory for simultaneous use by a plurality of state machines, the reprogrammable state machine memory comprising: a program memory for storing data relating to states within each state machine, the data for each state stored at a state address; a plurality of initial state address memory locations, each initial state address memory location for storing a first state address of a state machine from the plurality of state machines; means for storing the data within the program memory, data relating to each new state stored at a state address for said new state and data relating to the new first state stored at the new first state address, the data stored in storage locations unoccupied by data forming part of any of the plurality of state machines; and, means for once the data corresponding to each new state is stored, storing the new first state address within the first state address location one of atomically and pseudo-atomically, where no other memory access operation is performable by a state machine from the plurality of state machines during a duration of the one of the atomic and pseudo-atomic storing operation once the one of the atomic and pseudo-atomic storing operation has commenced.

In accordance with the invention there is provided a method of reprogramming state machine memory, the state machine memory comprising a plurality of storage locations and a first state address storage location, comprising the steps of: providing data corresponding to each new state, the data including data corresponding to all states from which each new state is reachable including a new first state; storing the data within the program memory, data relating to each new state stored at a state address for said new state, the data stored in storage locations unoccupied by data for use with currently executing state machines; storing data relating to the new first state at the new first state address, the data stored in an storage location unoccupied by data for use with currently executing state machines; and once the data corresponding to each new state is stored, replacing data within the first state address location with data indicative of the new first state address one of atomically and pseudo-atomically, where no other memory access operation is performable by a state machine during a duration of the one of the atomic and pseudo-atomic replacing operation once the one of the atomic and pseudo-atomic replacing operation has commenced.

In accordance with the invention there is provided a method of programming state machine memory, the state machine memory comprising a plurality of locations and a first state address storage location, comprising the steps of: providing an image of current state machine memory on a computer; altering the state machine programming; determining states that are modified within the current state machine; determining states from which the states that are modified are reachable including a new first state; determining memory locations within the current state machine memory unoccupied by data associated with a state machine in execution; compiling the modified states and the states preceding the states that are modified for storage in memory locations within the current state machine memory unoccupied by data associated with a state machine in execution to form reprogramming data; storing the reprogramming data within the memory locations within the current state machine memory unoccupied by data associated with a state machine in execution; once the reprogramming data is stored, replacing data within the first state address location with the new first state address; and, updating the image of the current state machine.

BRIEF DESCRIPTION OF THE DRAWINGS

An exemplary embodiment of the invention will now be described in conjunction with the attached drawings, in which.

DETAILED DESCRIPTION OF THE INVENTION

As used herein, the term data packet encompasses the terms buffer, frame, cell, packet, and so forth as used in data communications. Essentially a data packet is a grouping of data that is classifiable according to a predetermined classification. Classifications are commonly codified by standards bodies, which supervise communication standards.

In the state diagrams presented in the Figures, a state represented by a rectangle is a terminal state. Other than terminal states are represented by triangles.

Figure 1A:
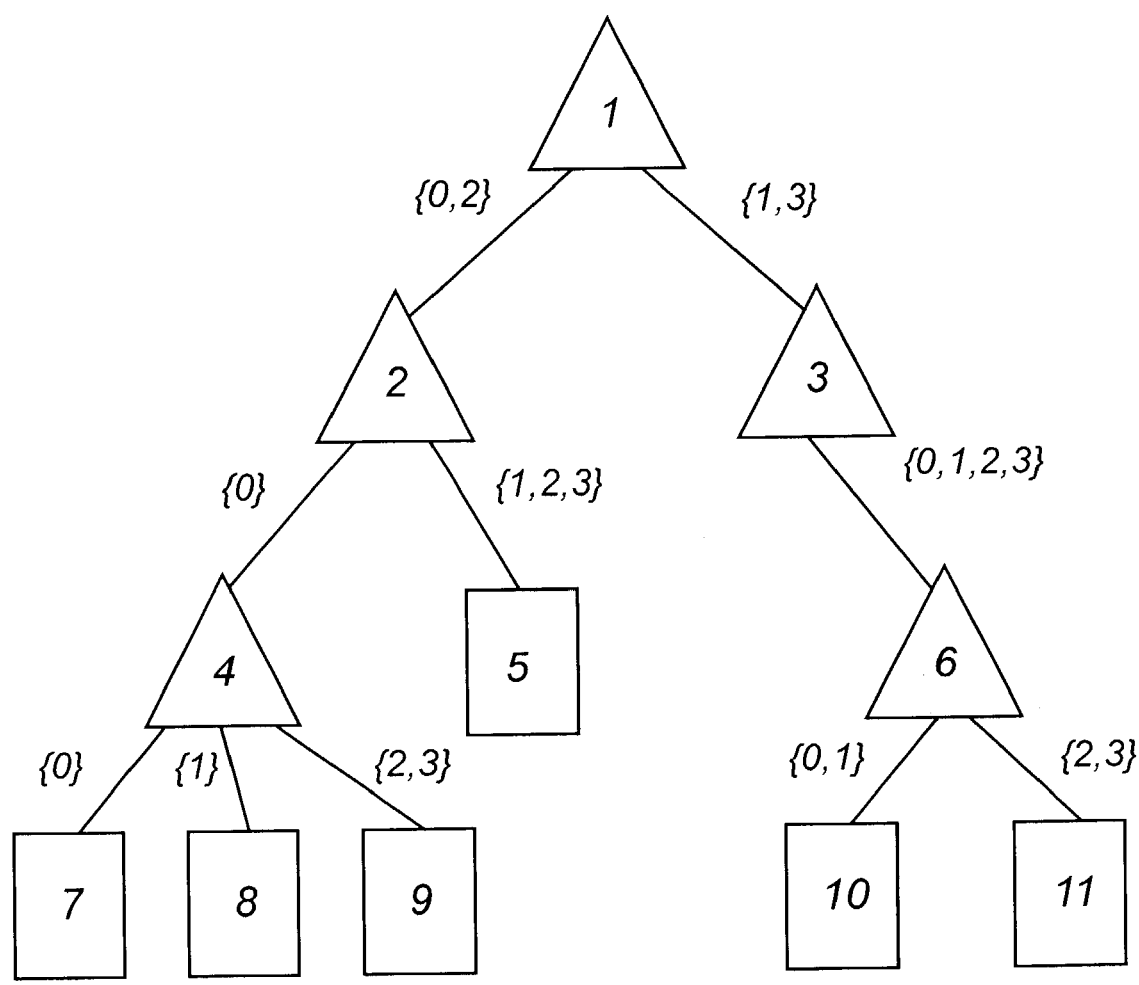
FIGS. 1a and 1b are simplified state diagrams for classification state machines according to the prior art.

Referring to FIG. 1*a*, a simplified state diagram for a state machine supporting a single data access operation per data cycle is shown. Each state is in the form of a look-up table at a state address. The states are represented as blocks having four state transitions, each shown as a line to another state. Sometimes, several state transitions lead to a same next state. A predetermined number of bits (2 for the simple diagram of FIG. 1*a*) is loaded into the lowest order bits of the address, and data from the newly formed address is read. When the data comprises another state address, the next predetermined number of bits from the data stream is loaded into the lowest order bits. Otherwise an action such as filtering or packet classification is performed.

Generally, in order to reprogram such a state machine it is necessary to interrupt operation of the state machine, which results in unwanted "downtime". New programming is stored in the state machine memory after which state machine execution proceeds. Unfortunately, data flow does not stop when filtering or classification is unavailable. In light of the above, it will be evident that interruption of a single state machine's processing capabilities has negative implications. Therefore, a method of reprogramming the state machine without interrupting the operation of the state machine is desirable.

For example, when such a programmable state machine is implemented in hardware, the address of block I is fixed. Typically, the address is 0. Of course another fixed address is possible. Since writing a single block, for example 1, often requires storing data in each of several locations thereby requiring more than a single clock cycle, there is a time during reprogramming when the block is partially reprogrammed. If the state machine reaches the block while it is partially programmed, indeterminate results occur. This is undesirable.

Figure 1B:
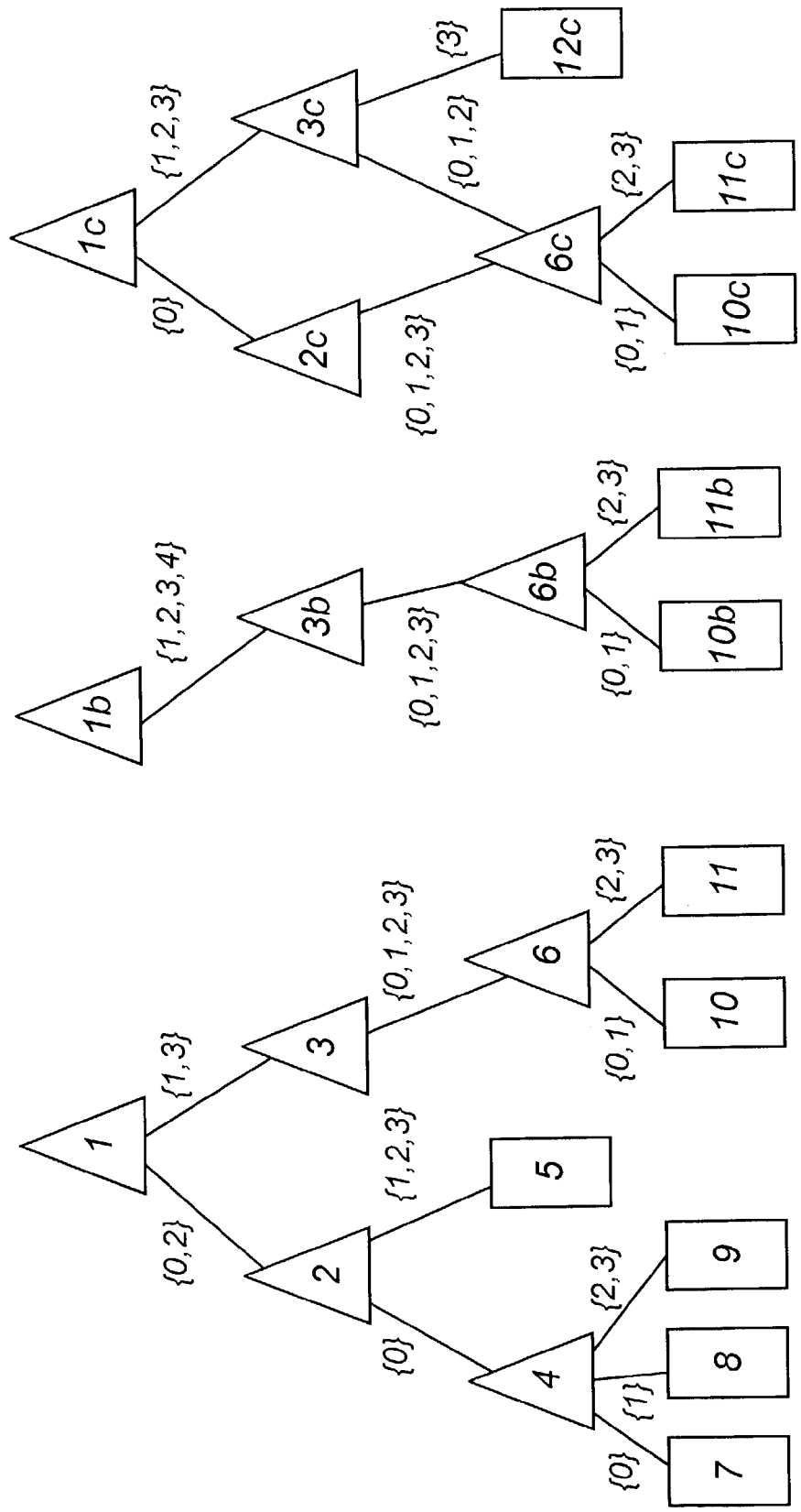
Figure 1C:
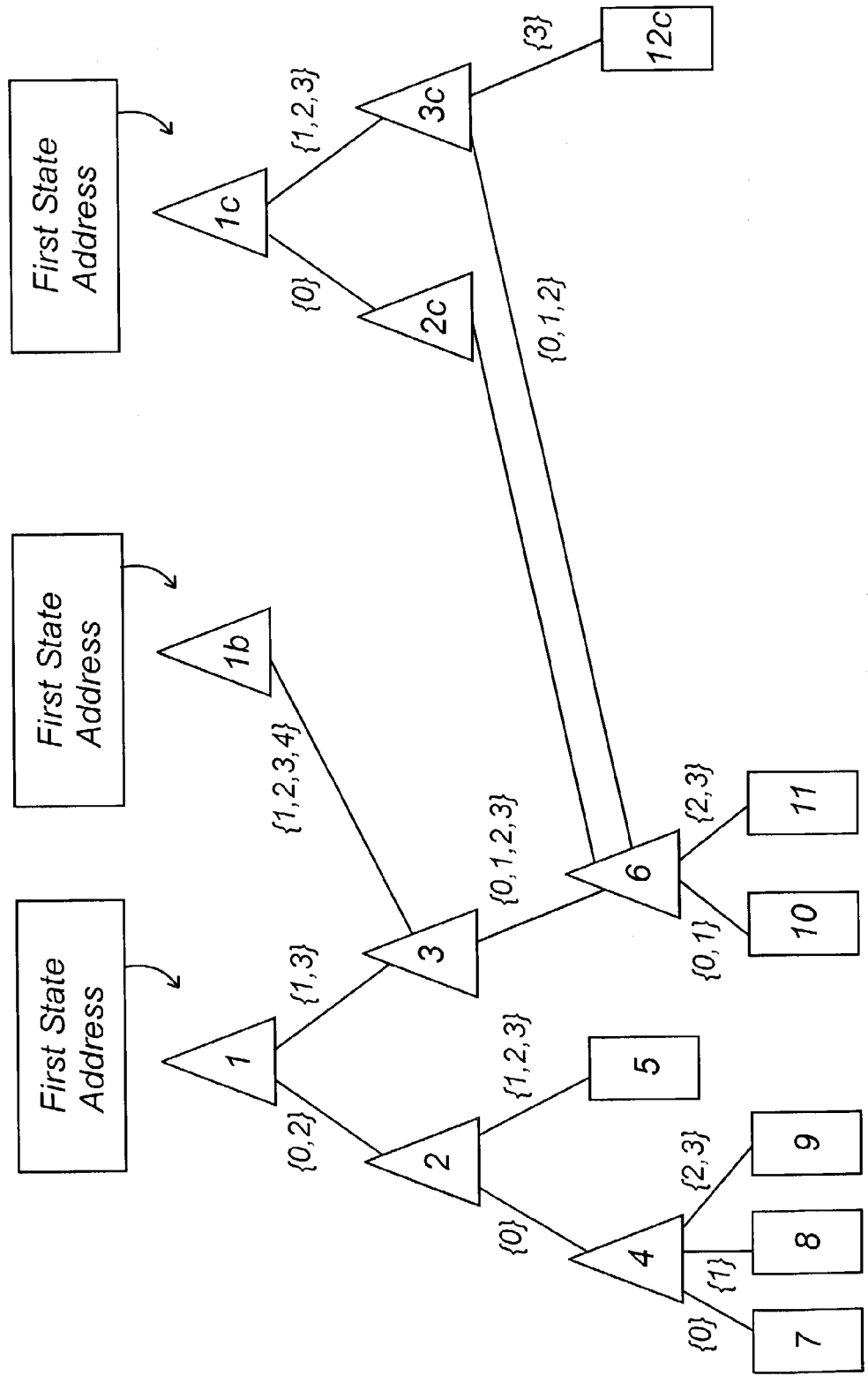
FIG. 1c is a simplified state diagram for classification state machines according to the invention.

Referring to FIG. 1*b*, three state machines stored within a single memory are shown. Each has completely separate blocks and, as such, each is independent of the others. In order to reprogram one of the state machines, it alone needs to be interrupted. Unfortunately, there is little benefit in storing programming of several state machines within a single memory when they are truly independent. In contrast, where a plurality of state machines share a single memory and share some programming, reprogramming of one of the plurality of state machines results in "downtime" for all the state machines that share the single memory. Referring to FIG. 1*c*, shown is a similar state diagram to that of FIG. 1*b* in which the three state machines share a same program memory and similar blocks, for example 6, 6*b*, and 6*c*, are stored as a same block (6). As is evident from FIG. 1*c*, each state machine executes a different programming. Presently, it is difficult to reprogram the state machine memory of FIG. 1*c* without interrupting execution of all three state machines.

Figure 2:
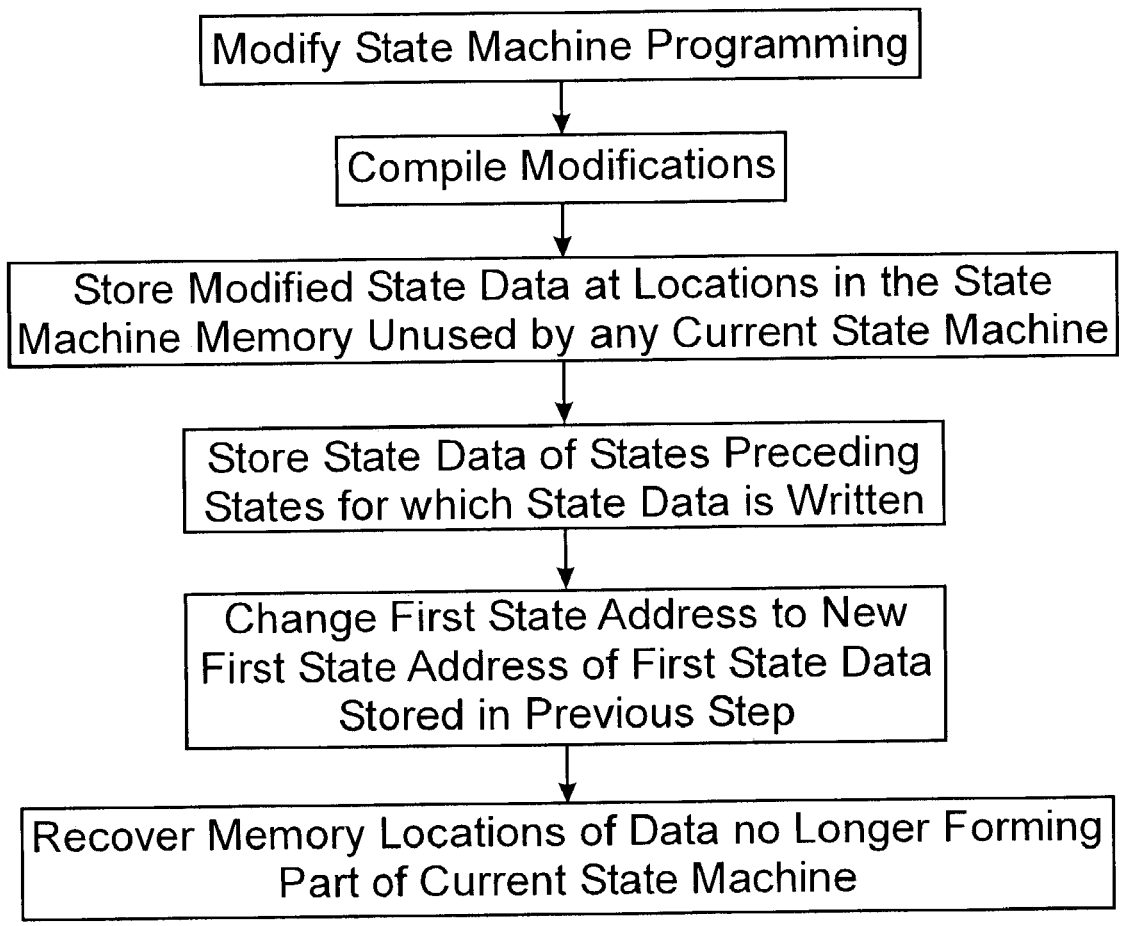
FIG. 2 is a simplified flow diagram of a method of reprogramming a state machine during execution according to the invention.

Referring to FIG. 2, a simplified flow diagram of a method according to the invention is shown. A state machine executes a classification function. Preferably, the classification function is an acyclic classification function, but this need not be so. The state machine is based on a table look-up for each state transition and information relating to each state transition is stored as a table of data at a state address. In operation, a first state address is read from a first state address storage location. The first state address is an address that is read at a start of state machine operation. The first state address indicates a first table.

A programmer of the state machine comprises a processor for differentiating between storage locations that contain state machine data and those that do not. Commonly, this is performed by maintaining information relating to locations where current state machine information is stored. The programmer is provided with modifications to current state machine programming. For example, a table of data relating to a second state of the state machine is modified. The programmer writes any new information to the memory in storage locations that are unused by current state machines. Unused storage locations do not contain current state machine programming data.

As is evident to those of skill in the art, in order to link the newly written states into the existing states within the state machine requires modification of some states, which is not easily performed during operation of one or more state machines. One approach to solving this problem is to stop operation of the state machine until the reprogramming is complete. Stopping operation of the state machine prevents data being processed and is therefore undesirable. According to the invention, each state preceding any modified states is also written to program memory unused by current state machine programming. The newly written states form a start of the state machine programming from a beginning of state machine operation until a point in the state machine programming from which no further modifications are being made. Once the data is written, the first state of the newly written data is a first state of the state machine. Therefore, by modifying the information stored in the first state address location, the newly written state data is used during a subsequent execution of the state machine—the modified state machine is executed. Preferably, this operation is performed atomically. An atomic operation is a single indivisible operation that takes place in a length of time. A pseudo-atomic operation is an operation that takes place in a length of time, where no other operation can interrupt the pseudo-atomic operation once the pseudo-atomic operation has started. In accordance with the present invention, atomic and pseudo-atomic operations relate specifically to interposed memory access operations. As such, a pseudo-atomic operation is an operation that takes place, where no other memory access operation is performable during the duration of the pseudo-atomic operation once the pseudo-atomic operation has started. It is possible to ensure that no first state address location is read during a non-atomic first state address write operation; however, this results in a small amount of downtime for the state machine and is, therefore, undesirable. The term "modified state" as used herein denotes states that are modified as well as those states that are newly created. It will be apparent from the above description that reprogramming of the state machine memory is now possible during state machine operation absent pausing state machine execution or with minimal pause when other than an atomic operation is used to store the first state address. Once the first state address is updated, a subsequent execution of the state machine uses the programming of the modified state machine. However, until the first state address is updated, the unmodified programming of the state machine is executed.

Of course, once the first address is updated, storage locations associated with states that are modified—state data was rewritten for those states—become unused storage locations given that data for those states is not in use by another different state machine. The resulting storage locations unused by current state machine programming are then "recovered" for use in further processes of reprogramming the state machine memory.

Typically, the first state address is stored in a first hardware register to enable fast access to the address. When a hardware register is used, an atomic operation to write the first state address is typically used. For example, the number of bits stored in a single clock cycle is equal to the number of bits within the register. Alternatively, a pseudo-atomic operation is used. For example, the write operation writes a number of bits per available cycle and those bits are all simultaneously clocked into the register once the entire address is available. Further alternatively, a second other register is written in several clock cycles and a flag bit is then updated to cause the newly written register to be read as the first state address instead of the first hardware register. Other methods of making the changeover from the first hardware register with an old first state address to a hardware register with the new first state address atomically will be evident to those of skill in the art based on the above disclosure.

Alternatively, the first state address is stored at a fixed address within the program memory from which it is capable of being loaded and into which it is capable of being stored in an atomic or pseudo atomic fashion. Preferably, the first state address is accessible in a single clock cycle.

Figure 3:
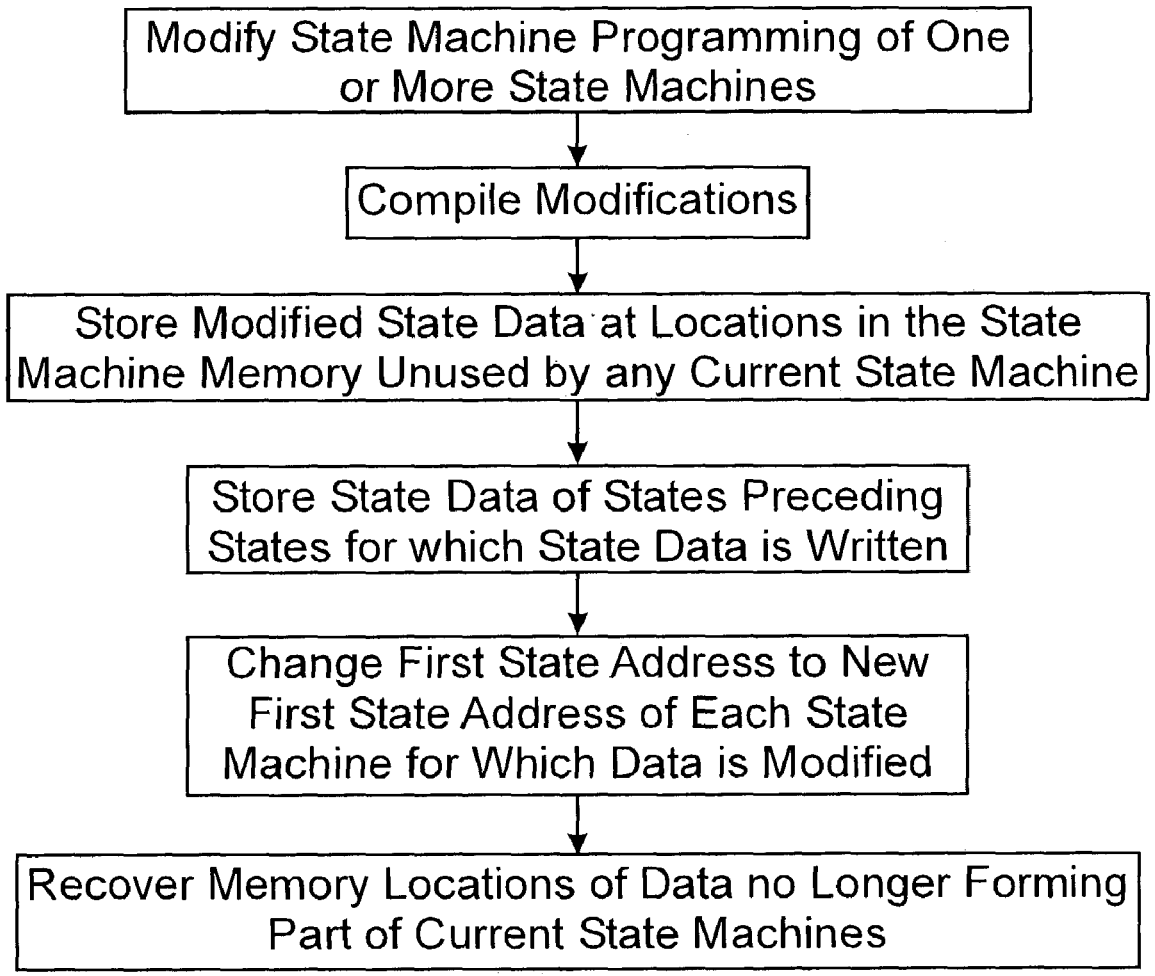
FIG. 3 is a simplified flow diagram of a method of reprogramming a plurality of state machines during execution according to the invention.

Referring to FIG. 3, a method of reprogramming a state machine during execution and according to the invention is shown. The method shown is for a state machine program memory in concurrent use by a plurality of state machines.

Each state machine executes a classification function. Preferably, the classification function is an acyclic classification function, but this need not be so. The state machines, similar to the state machine described with reference to FIG. 2, are based on a table look-up for each state transition and information relating to each state transition is stored as a table of data at a state address. In operation, a first state address is read from a first state address storage location. The first state address is an address that is read at a start of state machine operation of each state machine. When state machines are individually programmable, each state machine has an associated first state address.

A programmer of the state machine comprises a processor for differentiating between storage locations that contain state machine data and those that do not. Commonly, this is performed by maintaining information relating to locations where information of current state machines is stored. The programmer is provided with modifications to programming of current state machines. For example, a table of data relating to a second state of the first state machine is modified. The programmer writes any new information to the memory in storage locations that are unused by current state machine programming. Unused storage locations do not contain state machine programming data relating to any current state machine. According to the invention, each state preceding any modified states is also written to program memory unused by current state machine programming. The newly written states form a start of the state machines' programming from a beginning of state machines' operation until a point in the state machines' programming from which no further modifications are being made. Once the data is written, the first states of the newly written data are first states of the state machines. Therefore, by modifying the information stored in the first state address locations the newly written state data is used during subsequent executions of the state machines, i.e., the modified state machines are executed.

As noted above, it is important that the modification of the first state address occurs in an atomic or pseudo-atomic fashion. Alternatively, state machine operation is paused during writing of the first state address. Otherwise, it is possible that the first state address is accessed during writing of the first state address and that the address loaded for starting execution of the state machine is non-sensical.

It will be apparent from the above description that reprogramming of the state machine memory is possible during execution of any number of state machines. Once one of the first state addresses is updated, any subsequent execution of the associated state machine involves the modified state machine programming. Until a first state address is updated, unmodified state machine programming is executed. In this manner, when each state machine is in execution of different programming, the present invention permits reprogramming of one state machine without interrupting operation of other state machines.

Once a new first state address is stored, it is possible to recover memory. Even though memory recovery is optionally performed immediately, reprogramming should not be performed until the currently executing state machines restart. This prevents the possibility that a state of the previous state machine that is in execution is overwritten during execution. A method of memory recovery is outlined below.

With the data associated with each state a counter indicating a number of states referencing that state is provided. When the first state address register is changed, a counter associated with data at the address pointed to by the contents of the first state address register prior to the change is decremented since there is one less reference to that state data. When the counter is zero, memory locations associated with that state are recovered and counters associated with data referenced from the data in the recovered memory locations are decremented. The memory recovery operation proceeds recursively until all counters having a zero value have been processed.

In an alternative embodiment, a timer is provided for providing a timing signal to pause state machine execution when the timer has expired. This is useful for programming of the programmable memory where a program must be stored by a certain time but also may be stored anytime prior. The program is entered and reprogramming is performed according to the above-described method. If reprogramming is not completed within the specified time, the state machine is paused between classification operations and the programming is completed.

Figure 4:
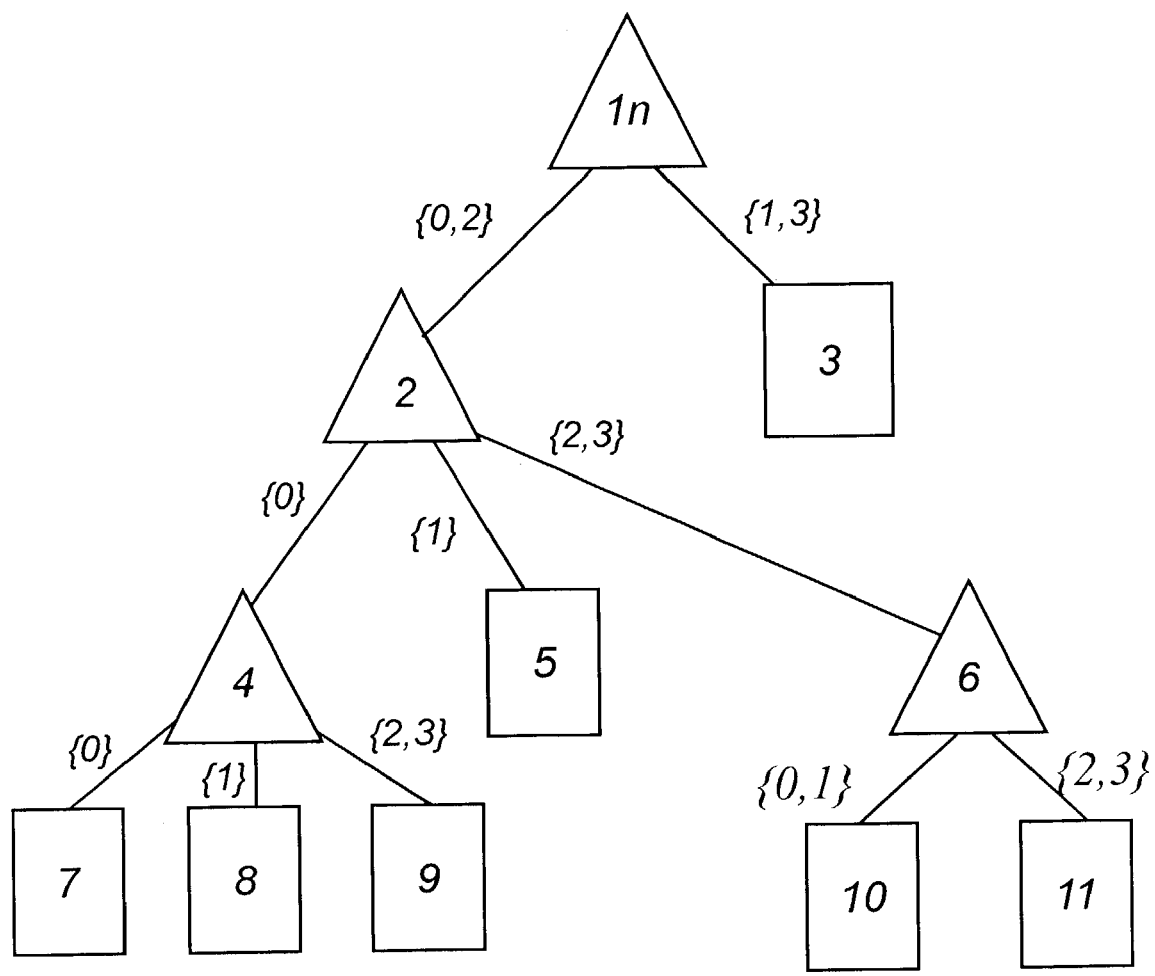
FIG. 4 is simplified state diagram of a greatly simplified state machine.
Figure 5:
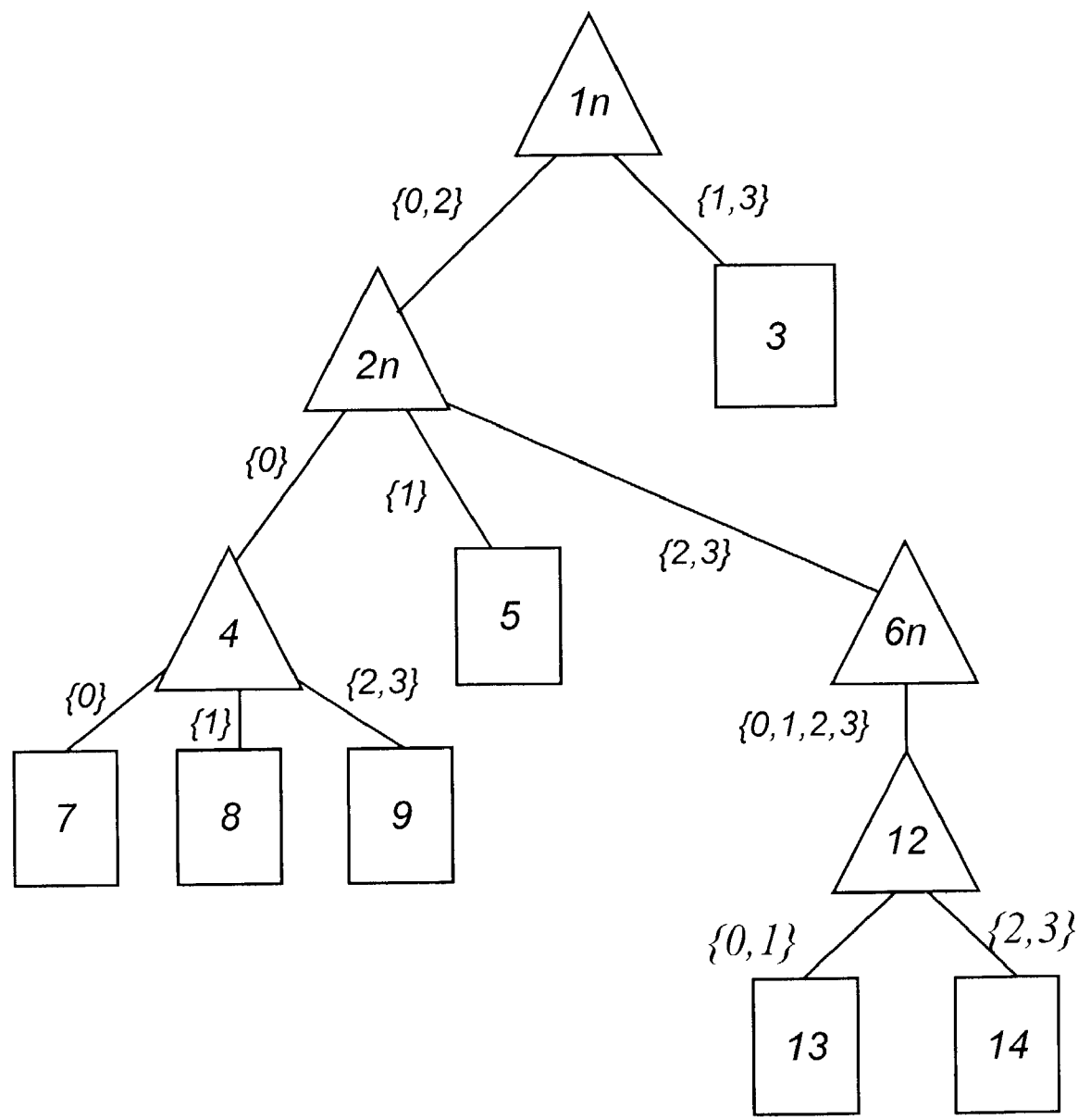
FIG. 5 is simplified state diagram of the greatly simplified state machine of FIG. 4 with modifications thereto.
Figure 6:
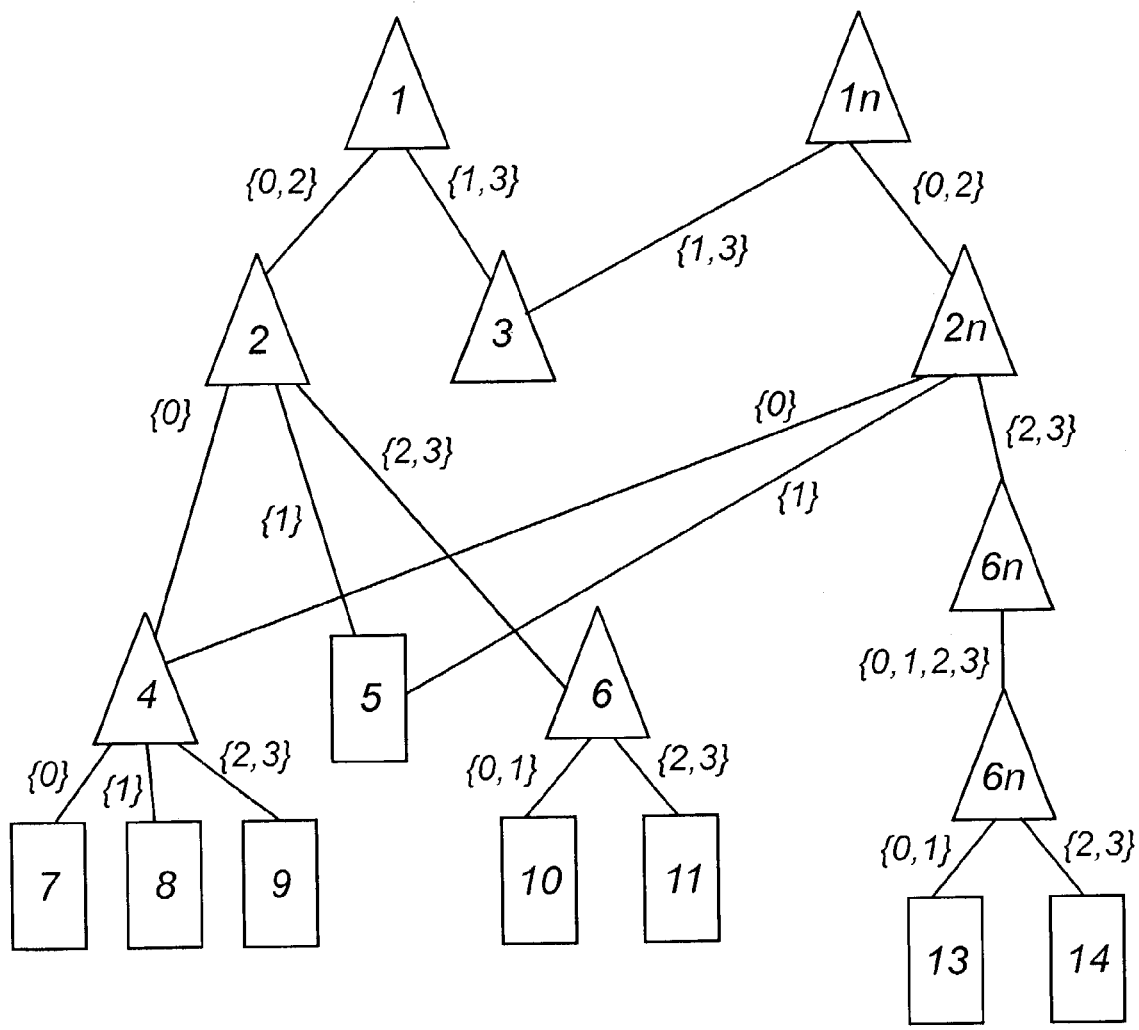
FIG. 6 is a simplified state diagram of the combined state machines of FIGS. 4 and 5.

According to another embodiment of the invention, when a buffer is used to buffer data prior to its provision to the state machine, the timer may be implemented to determine an amount of processing time to devote to the reprogramming task. For example, when new programming is introduced, it may be desirable to provide 10% of the processing power or the state machine devoted to reprogramming. Of course, when the state machine requires less than 90% of its processing power, the reprogramming operations may consume the available processing time. A non-limiting example of an application of the present invention is shown with reference to FIGS. 4, 5, and 6. FIG. 4 is a state diagram of a current state machine having states 1 to 11. When it is desired to modify states 6, 10, and 11, prior art devices require pausing of state machine execution. For ease of description, the state diagram is shown with eleven states, however, in practice the number of states is only limited by the memory size of the state machine and the operation performed. Alterations are made to an image of the state machine of FIG. 4 resulting in a state machine represented by the state diagram of FIG. 5 having modified states $6n$, 12, 13 and 14. As one skilled in the art will appreciate, it is possible to modify or add many new states, the number of which is only limited by the memory size of the state machine memory. Memory contents for the state machine illustrated in FIG. 4 are shown in FIG. 6 along with the modified states In, $2n$ and $6n$. Data relating to the new and/or modified states, i.e., In, $2n$ and $6n$ are written into memory storage locations unused by currently executing state machine programming. In FIG. 6 the state machine programming for both state machines, that of FIG. 4 and that of FIG. 5, are evident within the state diagram. From state 1 a first state diagram proceeds and from state $1n$ a second other state diagram proceeds. The states 3, 4, 5, 7, 8, and 9 are common to both state diagrams. In fact, state In is similar to state 1 but since state $2n$ is different, it is also different. Similarly state $2n$ is similar to state 2 but since state $6n$ is different, it is also different In order to distinguish between the state machine of FIG. 4 and that of FIG. 5, one must determine the start address of the state machine. Once all the new and/or modified state data are stored in memory the start address of the state machine is updated with a new first state address, that of state in. The operation is performed atomically or pseudo-atomically. The next time the state machine begins execution, it uses the newly stored data. Sufficient state machine memory is provided to allow use of either state machine programming depending on the selected start address. Thus, even if three state machines use identical programming, it is possible to modify the programming of one and not the others, given three separate first state address locations. It is important that state transitions are maintained during modification of state machine programming to prevent "downtime". When the start address is that of state in, the state machine diagram of FIG. 5 is the current state machine diagram having modified states $1n$, $2n$ and $6n$. Memory locations associated with states that are not accessed by any state machine—in this case by the single state machine—are now "free" storage locations or storage locations unused by current state machine programming.

It is evident to those of skill in the art that all memory locations are occupied and that the term "unoccupied" as used herein refers to memory locations that are not occupied by current state machine program data.

Of course, when two or more banks of memory are used, switching between banks allows for reprogramming of the off-line bank while execution of programming in the on-line bank occurs. Effectively, in some situations, the two banks of memory are program memory and the start addresses in each bank are identified by a current bank. Therefore, the indicator for identifying the current bank forms a start address storage location. When two banks are used, the start address storage location need only accommodate one bit of data, which is necessarily written one of atomically and pseudo-atomically.

Though the start address is described above as stored in a location, it is possible to devote two locations to the first state's programming and to select between the two locations based on an indicator bit. In these cases, the indicator bit forms the start address —address 0 or address 1—and the data may be stored in a flip-flop or in another conventional fashion.

Optionally, when two or more banks of memory are used, another indicator bit is provided that is used to determine whether to copy program data between data banks. The copying of program data from an online bank to an offline bank facilitates providing of similar programming data in the offline data bank prior to being selected for having program data stored therein executed.

Also, though the step of loading the current state address at the beginning of state machine execution refers to loading the address from the start address location, when a flip flop is used to indicate a current bank of memory, the address of the first state's programming is typically fixed except for selection of the appropriate bank. Therefore, the current state address is loaded with the fixed address though the memory location that the programming data is retrieved from is dependent upon the content of the data relating to the start address. In this case, the current state address register contains less than the necessary address data to determine the current state address and the start address location forms part of the current state address in so far as it determines which of the available fixed start addresses to use.

Figure 7:
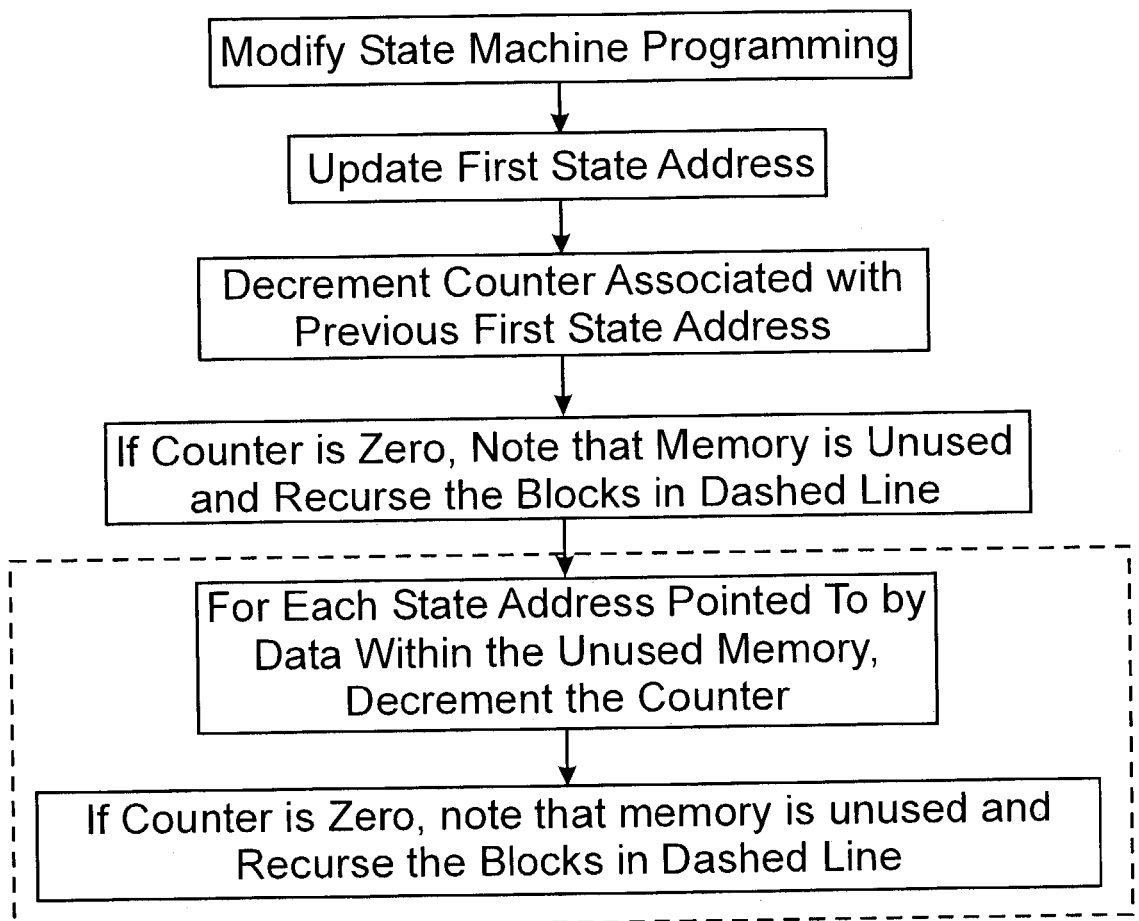
FIG. 7 is a simplified flow diagram of a method of memory recovery according to the invention; and, FIG. 8 is a simplified state diagram of a cyclic state machine for explanation of the present inventive method.

Referring to FIG. 7, a simplified flow diagram of a method of recovering memory unused by any currently executing state machine is shown. When new state data is stored in the program memory, the existing state data remains unchanged. Once the first state address of each modified state machine is updated to reflect a new first state address for that state machine, the replaced state machine data is identified and noted as unused state machine memory.

In order to identify unused memory locations, a value is stored with state data for each state indicating a number of references to that state data. The state data to which the previous first state address referenced is accessed and the value therein is decremented. If the value is 1 or greater, then their still exists a reference to that state data and it is not noted as unused memory. If the value is zero, then the state machine data at that location is not referenced and it is noted as unused. All state machine data referenced from that data is then accessed and the value associated therewith is decremented. The method proceeds, recursively, until there remains only state machine data with associated values of 1 or more. Of course, the method could also be implemented iteratively if so desired.

The use of such a method makes memory recovery simple and allows for self-contained state machine programming including all necessary information for programming and reprogramming of same. It is therefore advantageous.

Figure 8:
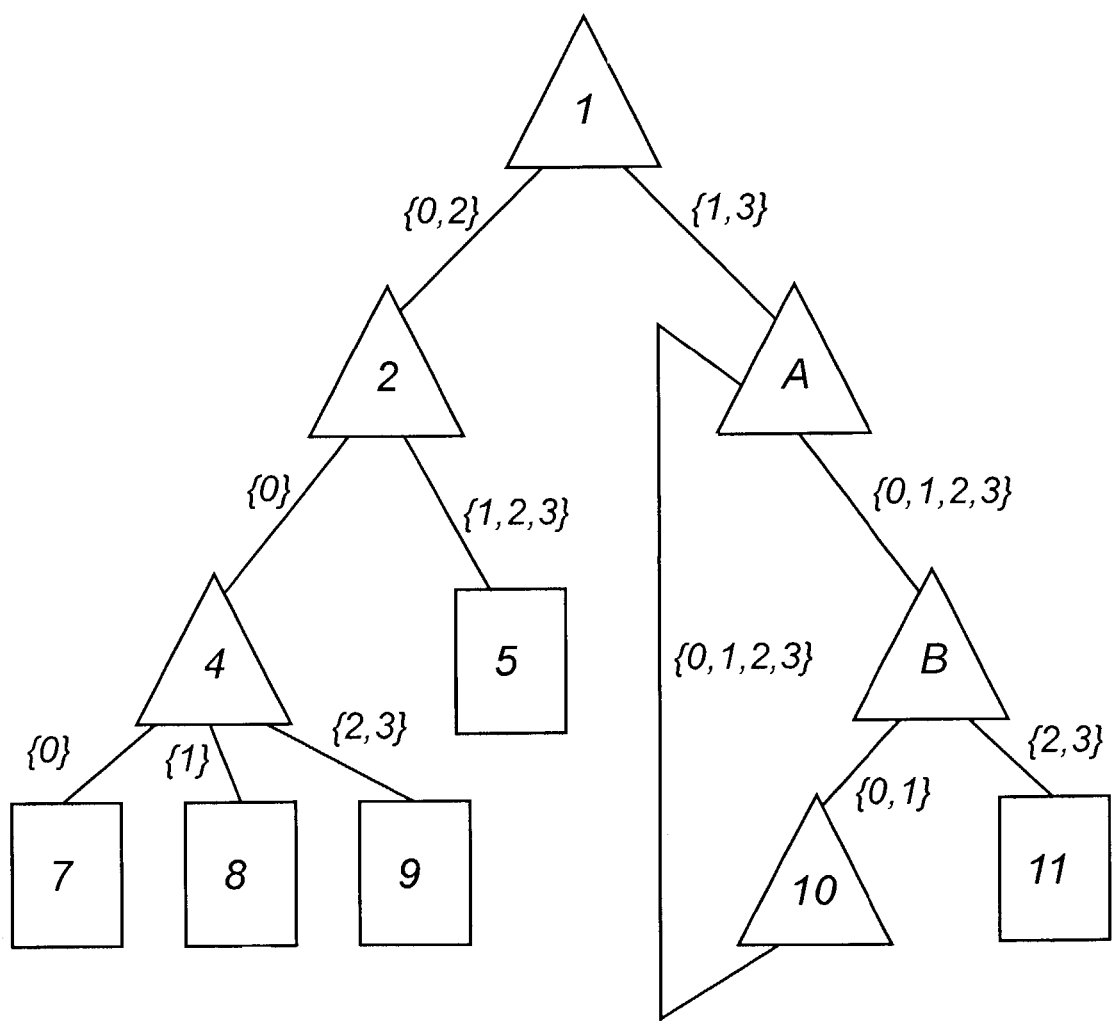

Though states are described as preceding other states or following other states, this terminology is most applicable to an acyclic state machine. For cyclic state machines, the term "reachable from" is a more accurate statement of a state that follows another state. For example, state A is reachable from state B is, for an acyclic state machine, equivalent to state A follows state B. A cyclic state machine is shown in FIG. 8 in which A is reachable from B. Incremental programming according to the invention is still useful. For modifying a single node all nodes from which the modified single node is reachable are then updated. If from a part of the graph the updated nodes are not reachable, that part of the graph need not be modified.

Numerous other embodiments of the invention are envisioned without departing from the spirit or scope of the invention.

What is claimed is:

1. A reprogrammable firmware state machine device comprising:
    a program memory for storing programmable data relating to at least one of state machine states and state machine state transitions of the firmware state machine device;
    a start address memory location supporting one of atomic and pseudo-atomic write operations of data to the entire location and for storing data indicative of a start address of firmware state machine device programming stored within the programmable memory, the data indicative of a start address of the firmware state machine device, the start address reprogrammable during operation of the firmware state machine device;
    where no other memory access operation is performable by the reprogrammable state machine during the duration of the one of the atomic and pseudo-atomic write operation once the one of the atomic and pseudo-atomic write operation bas commenced, the one of the atomic and pseudo-atomic write operation being other than a suspension of the firmware state machine device pending receipt of user data; and
    where completion of at least one of the atomic and pseudo-atomic write operations results in storing at least data within the program memory, the data pertaining to a reprogramming of the state machine with a new first machine state at a new first state address for a subsequent execution by the firmware state machine device.

2. A device as defined in claim 1, wherein the data indicative of a start address includes data indicative of an address of data relating to a first state for execution within the firmware state machine device.

3. A device as defined in claim 2, comprising a current state address register separate from the program memory and for having stored therein a current state address for a state machine during execution of the firmware state machine device.

4. A device as defined in claim 2, wherein the data relating to a first state for execution within the firmware state machine device is stored in memory that is read-only to the firmware stale machine device.

5. A device as defined in claim 2, comprising:
    means for storing the data within the program memory, data relating to each new state stored at a state address for said new state and data relating to the new first state stored at a new first state address, the data stored in storage locations unoccupied by the state machine and during execution of the firmware state machine device; and,
    means for, once the data corresponding to each new state is stored, replacing the data indicative of a start address within the start address memory location with data indicative of the new start address.

6. A device as defined in claim 5, wherein re-execution of the firmware state machine device begins by loading a current state address with an address based on the contents of the start address memory location.

7. A device as defined in claim 6, wherein the data indicative of the new start address comprises the address of the data relating to the first state for execution in the firmware state machine device.

8. A device as defined in claim 7, wherein re-execution of the firmware state machine device begins by loading the current state address with an address previously stored in the start address memory location.

9. A device as defined in claim 1, comprising the following steps:
    determining a state to which a first state address that is replaced points;
    repeating the following steps:
        decrementing a counter associated with the determined state, and
        when the counter is zero, determining that data associated with tat state is unoccupied; selecting a state pointed to by data within the determined state as the determined state.

10. A reprogrammable state machine memory for simultaneous use by a plurality of firmware state machines, the reprogrammable state machine memory comprising:
    a program memory for storing data relating to states within each firmware state machine, the data for each state stared at a state address;
    a plurality of initial state address memory locations, each initial state address memory location for storing a first state address of a firmware state machine from the plurality of firmware state machines;
    means for storing the data within the program memory, the data relating to each new state stored at a state address for said new state and data relating to the new first state stored at the new first state address, the data stored in storage locations unoccupied by data forming part of any of the plurality of firmware state machines and pertaining to a reprogramming of the firmware state machine with the new first machine state at the state address for said new state for a subsequent execution of the firmware state machine, and,
    means for once the data corresponding to each new state is stored, storing the new first state address within the first state address location one of atomically and pseudo-atomically,
    where no other memory access operation is performable by a firmware state machine from the plurality of firmware state machines during a duration of the one of the atomic and pseudo-atomic storing operation once the one of the atomic and pseudo-atomic storing operation has commenced, the one of the atomic and pseudo-atomic storing operation being other than a suspension of the firmware state machine pending receipt of user data.

11. A reprogrammable state machine memory as defined in claim 10, wherein atomically or pseudo-atomically precludes an operation for reading the first state address location during the storing of the new first state address.

12. A reprogrammable state machine memory as defined in claim 10, comprising: a plurality of current state address registers, one associated with each firmware state machine from the plurality of firmware state machines and for storing a current state address of the associated firmware state machine.

13. A reprogrammable state machine memory as defined in claim 12, wherein re-execution of a firmware state machine from the plurality of firmware state machines begins by loading the current state address register associated with said firmware state machine with an address based on the contents of the initial state address memory location associated with said firmware state machine.

14. A reprogrammable state machine memory as defined in claim 13, wherein re-execution of a firmware state machine from the plurality of firmware state machines begins by loading the current state address register associated with said firmware state machine with an address previously stored in the initial state address memory location.

15. A method of reprogramming firmware state machine memory, the firmware state machine memory comprising a plurality of storage locations and a first state address storage location, comprising the steps of:
providing data corresponding to each new state, the data including data corresponding to all states from which each new state is reachable including a new first state;
storing the data within the program memory, data relating to each new state stored at a state address for said new state, the data stored in storage locations unoccupied by data for use with currently executing firmware state machines;
storing data relating to the new first state at the new first state address, the data stored in an storage location unoccupied by data for use with currently executing firmware state machines; and
once the data corresponding to each new state is stored, replacing data within the first state address location with data indicative of the new first state address one of atomically and pseudo-atomically,
performing no other memory access operation by a firmware state machine during a duration of the one of the atomic and pseudo-atomic replacing operation once the one of the atomic and pseudo-atomic replacing operation has commenced, the one of the atomic and pseudo-atomic replacing operation being other than a suspension of the firmware state machine pending receipt of user data,
where completing of at least one of the atomic and pseudo-atomic write operations results in a reprogramming of the firmware state machine for a subsequent execution of the firmware state machine.

16. A method as defined in claim 15, wherein replacing data within the first state address location with data indicative of the new first state address atomically or pseudo-atomically consists of replacing data within the first state address location using at least an operation precluding a further operation for reading the first state address location during the step of replacing of the data within the first state address location.

17. A method as defined in claim 15, wherein the firmware state machine is acyclic and wherein a new state is reachable from a state if said state precedes the new state.

18. A method as defined in claim 15, wherein the reprogramming of the firmware state machine is performed during execution of the firmware state machine.

19. A method as defined in claim 18, wherein the reprogramming of the firmware state machine is performed without interruption of execution of the firmware state machine.

20. A method as defined in claim 18, wherein the firmware state machine memory is for simultaneous use by a plurality of firmware state machines, and wherein programming of a first firmware state machine from the plurality of firmware state machines is same as programming of a second firmware state machine of the plurality of firmware state machines.

21. A method as defined in claim 15, wherein the firmware state machine memory is for simultaneous use by a plurality of firmware state machines, and wherein programming of a first firmware state machine from the plurality of firmware state machines is different from programming of a second firmware state machine of the plurality of firmware state machines.

22. A method as defined in claim 15, wherein the firmware state machine memory is for simultaneous use by a plurality of firmware state machines, and wherein reprogramming of a firmware state machine from the plurality of firmware state machines is performed during execution of the plurality of firmware state machines without interruption of execution of any other firmware state machine from the plurality of firmware state machines.

23. A method as defined in claim 15, wherein the firmware state machine memory is for simultaneous use by a plurality of firmware state machines, and wherein reprogramming of a firmware state machine from the plurality of firmware state machines is performed during execution of the plurality of firmware state machines with an interruption of execution for a fraction of the firmware state machine from the plurality of firmware state machines, the portion less than unity.

24. A method as defined in claim 15, wherein the firmware state machine memory is for simultaneous use by a plurality of firmware state machines, and wherein during reprogramming of a firmware state machine from the plurality of firmware state machines, data relating to another firmware state machine from the plurality of firmware state machines remains unaltered.

25. A method of reprogramming firmware state machine memory, the firmware state machine memory comprising a plurality of locations and a first state address storage location, comprising the steps of:
providing an image of current firmware state machine on a computer, the current firmware state machine one of a plurality of firmware state machines in execution;
altering the firmware state machine programming;
determining states that are modified within the current firmware state machine;
determining states from which the states that are modified are reachable including a new first state;
determining memory locations within the current firmware state machine memory unoccupied by data associated with the plurality of firmware state machines in execution;
compiling the modified states and the states preceding the states that are modified for storage in memory locations within the current firmware state machine memory unoccupied by data associated with a firmware state machine in execution to form reprogramming data;
storing the reprogramming data within the memory locations within the current firmware state machine memory unoccupied by data associated with a firmware state machine in execution;
once the reprogramming data is stored, replacing data within the first state address location of the current firmware state machine with the new first state address; and,
updating the image of the current firmware state machine.

26. A method as defined in claim 25, wherein the step of replacing data within the first state address location with the new first state address is performed one of atomically and pseudo-atomically, where no other memory access operation is performable by a firmware state machine during a duration of the one of the atomic and pseudo-atomic replacing operation once the one of the atomic and pseudo-atomic replacing operation has commenced.

27. A method as defined in claim 26, wherein replacing data within the first state address location with data indicative of the new first state address atomically or pseudoatomically consists of replacing data within the first state address location using at least an operation precluding a further operation for reading the first state address location during the step of replacing of the data within the first state address location.

28. A method as defined in claim 25, wherein the step of determining memory locations within firmware the current firmware state machine memory unoccupied by data associated with a state machine in execution comprises the following steps:

determining a state to which a first stare address that is replaced points;

repeating the following steps:

decrementing a counter associated with the determined state, and when the counter is zero, determining that data associated with that state is unoccupied; selecting a state pointed to by data within the determined state as the determined state.

* * * * *